May 28, 1946.  J. C. THORESEN ET AL  2,401,122
SAND EXPANSION INDICATOR
Filed Sept. 30, 1943
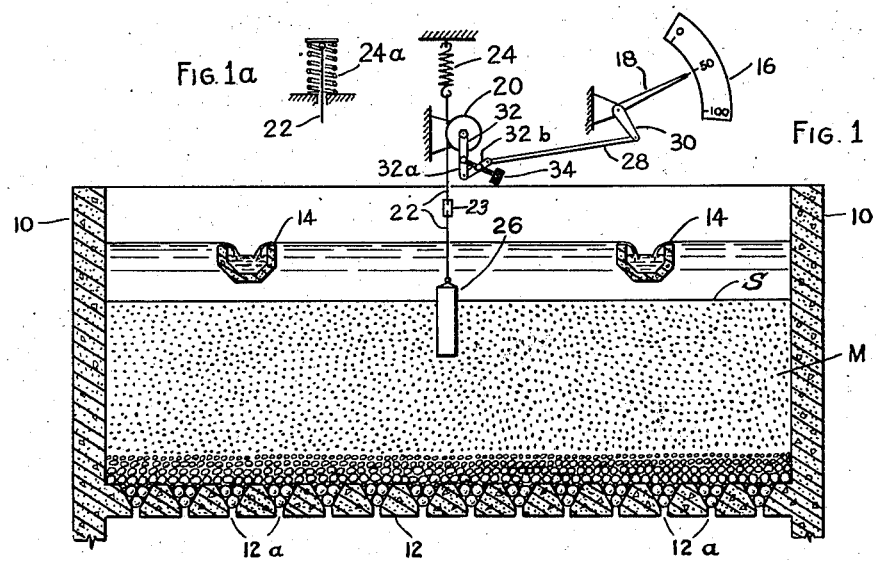
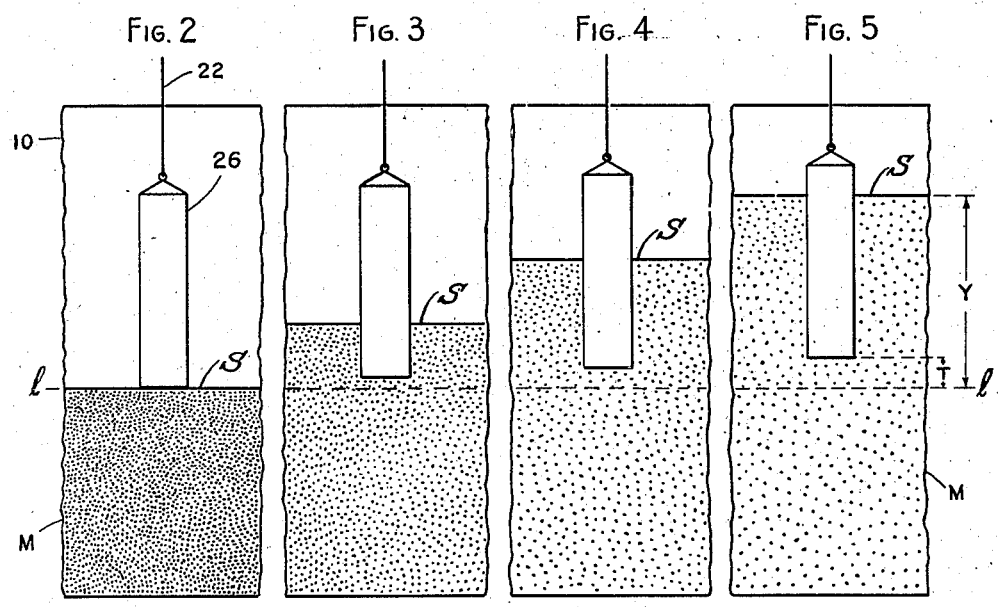
John C. Thoresen
John R. Hartley   INVENTORS
BY Harry Dexter Peck
ATTORNEY Patented May 28, 1946

2,401,122

UNITED STATES PATENT OFFICE 2,401,122

SAND EXPANSION INDICATOR

John C. Thoresen, Warwick, and John R. Hartley, Barrington, R. I., assignors to Builders Iron Foundry, Providence, R. I., a corporation of Rhode Island Application September 30, 1943, Serial No. 504,510

5 Claims. (Cl. 73—53)

This invention relates to an improved sand expansion indicator for filter beds.

In a typical filter the liquid to be cleaned flows through a bed of sand, pulverized coal or other filter medium which gradually collects the foreign matter from the liquid. In the course of time the bed itself becomes dirty and must be cleaned. This is usually accomplished by introducing wash water below the bed and forcing it upward through the filter medium to entrain the foreign matter and carry it off through suitable discharge troughs. As soon as the wash water is caused to flow upward through the filter the volume occupied by the filter medium becomes greater and its top surface rises. This phenomenon is known as expansion of the sand bed. The extent of such expansion depends upon the velocity and viscosity of the wash water and the size and shape of the particles which constitute the filter medium.

If the degree of expansion is too low the filter bed will not receive a thorough wash, localized collections of dirt, called "mud-balls," will form and the effectiveness of the filter will gradually diminish. "Mud-balls" will also cause unequal wash water distribution which may result in upheaval of the gravel and complete destruction of the bed.

If the expansion of the bed is too high, some of the filtering medium may be carried away to the sewer or large quantities of wash water wasted. For any given filter medium a minimum degree of expansion can be found that will provide thorough washing with the minimum use of wash water. Usually this is from 40-50% of the original bed depth. As the temperature and viscosity of the wash water vary from day to day the rate of flow of the back wash is regulated to maintain a constant degree of expansion.

When the wash water begins to flow upward through the sand bed it immediately becomes so dirty that the surface of the sand can not be seen. Apparatus has therefore been developed for indicating the extent of the sand expansion. The present invention is directed to improvements in such apparatus.

Heretofore, so far as we are aware, the apparatus available has depended upon the change in position of a float suspended in the liquid and supported substantially by the sand. Such a float has a density greater than the liquid in the filter but less than the density of the sand or a mixture of the sand and the liquid. The float normally rests approximately on the surface of the sand and as the sand expands and its surface rises, the float is moved upward accordingly. Obviously such a float must be light in weight and therefore it tends to become unstable. This makes the float tend to gyrate in a circle about its normal position with resultant inaccurate readings.

An object of our invention is therefore to provide an actuator which has stability. As some sand is always washed away during washing and as the bed depth is not always as anticipated, a further object of our invention is to provide means in the indicator to compensate for variations in bed depth usually encountered.

To provide the stability required, we have devised a relatively heavily loaded "displacer" which is supported from a point above the filter. This displacer does not follow the surface of the sand as it expands but is supported by a spring and by a lifting force corresponding to the extent to which the displacer is submerged in the expanded sand. This lifting force is created by the friction of the water flowing through the sand and it is influenced by the rate of flow and viscosity of the wash water and the size, shape and weight of the particles in the filtering medium. If the settled-bed depth does not change, then a constant ratio can be determined experimentally between the lifting force and the degree of sand expansion. Temperature changes will have no effect upon this ratio but they will affect the viscosity of the water and it is therefore necessary for the operator to maintain a higher wash water rate of flow in summer when the water is warm than in winter when it is cold, in order to obtain the same degree of expansion. To compensate for variations in settled-bed depth we include means in the indicator consisting of an adjustable-length arm and linkage which is described in more detail later.

The best mode in which we have contemplated applying the principles of our invention is shown in the accompanying drawing but this is to be deemed merely illustrative for it is intended that the patent shall cover by suitable expression in the appended claims whatever features of patentable novelty exist in the invention disclosed.

In the drawing,

Figure 1 is a vertical section through a typical filter bed showing the distribution of the sand and the positions of the indicator elements during the washing operation of the sand;

Figure 1a shows an alternate spring suspension; and

Figures 2, 3, 4 and 5 are similar sections showing the relative positions of the sand surface and the displacer for various degrees of expansion.

Referring to the drawing and particularly to Figure 1, the filter bed shown as typical has walls 10 and a bottom 12 with numerous outlets 12a for discharge of the filtered liquid.

The filter medium comprises a rather thick layer of sand or other suitable material M, supported by a bed of gravel carefully graded and placed in position, the stones at the bottom being usually about 2 inches in diameter and the stone size diminishing gradually to ⅛" diameter or less at the top of the gravel bed. Dirty liquid admitted above the sand flows downward and in passing through the sand foreign matter is filtered from the liquid and retained in the bed. When the latter becomes so dirty that it must be cleaned, wash water is forced upward through the bed, as for example being introduced through the bottom outlets 12a. At some distance above the sand are one or more troughs 14 into which the wash water and the entrained foreign matter can overflow for discharge from the bed to a sewer.

It is important that the rate of flow of the wash water be regulated to provide the most effective cleaning of the sand with the minimum use of wash water. The proper rate of flow, and the consequent sand expansion, can be predetermined for each filter bed and once this rate of flow has been determined all the attendant need know thereafter is when that degree of expansion has been established.

The apparatus embodying our invention is shown in its most elemental form for purposes of illustration. It comprises a scale 16 laid off in suitable units, for example the per cent of expansion of the sand bed. A pointer 18 is rotatably mounted to swing along this scale, being suitably connected with a drum or wheel 20 around which is passed a cord 22. The upper end of this cord is attached to a spring 24 and the other end is secured to a displacer 26. In Fig. 1 this spring is shown as a tension spring whereas in Fig. 1a is shown an arrangement whereby a compression spring 24a may be used if desired.

The displacer 26 is preferably in the form of a hollow cylinder containing enough material of some sort to give it the desired weight and with the remainder of its space filled with water. The displacer is designedly made much heavier per unit of volume than the liquid, or a mixture of the liquid and sand which is displaced. Obviously the displacer is not a float and to prevent it from settling down through the sand bed it must be supported in part at least by the spring.

When the filter is to be cleaned the displacer 26 is positioned as shown in Figure 2, with its bottom at the level l of the top surface of the sand, the cord 22 being provided with a turnbuckle 23 to enable its length to be adjusted with respect to the spring 24 so that the force of the latter supports the displacer in the said position. That is to say, the force exerted by the spring and the weight of the submerged displacer are in balance. The pointer 18 should under these conditions be opposite the zero mark on the scale 16.

The supply of wash water is now turned on and as it flows upward through the sand the latter is expanded and its surface rises. The sand and foreign matter offer resistance to the flow and thus affect the kinetic energy of the flowing water. A traverse of points in the said bed in a vertical direction will show that, in addition to the static pressure at each point (due to its distance from the water surface), there is another pressure whose value is zero at the top surface S of the sand and whose value increases in magnitude depending upon the distance of the point below the surface S. It is convenient to consider two such points in the expanded sand bed, one at the surface S and the other at the original elevation l of the settled bed.

When there is no upward flow of water the two levels l and S coincide, as shown in Fig. 2; and there is accordingly no lifting force acting on the displacer due to flow. The displacer is, of course, partly supported by the water, since any body submerged in water is buoyed up by a force equal to the weight of the water displaced by the body. But aside from this buoyant effect of the water (which can hereafter be neglected since it is a constant throughout the action of the displacer) the displacer is supported by the spring so that the bottom of the displacer is at the level l of the settled sand.

As the flow begins and the surface S of the sand rises, the lifting force due to the extra pressure in the sand bed becomes effective to cause the displacer to rise. The bottom of the displacer will not be lifted as high as the surface S of the expanded sand but only to some lesser extent as indicated in Figures 3, 4 and 5. As the rate of flow increases, the surface S of the expanded sand will rise higher and as it increases in distance from the bottom of the displacer the lifting force on the latter will be accordingly greater. The displacer will continue to rise higher until the said lifting force plus the force of the spring (which is reduced as the displacer moves upward) equal the weight of the displacer, so another condition of balance is established.

As before noted, to determine the effective lifting force on the displacer it is convenient to select two known levels in the sand mass, such as the normal level l of the settled bed and the level or surface S of the expanded sand. Between these two levels, an actual hydraulic gradient in the sand and water can be determined by suitable test gauges and this will show that the extra pressure at l, when flow is occurring, is the total lifting force at l. This follows because there is no such lifting force at S, being zero at this latter level. But this lifting force at l is not wholly effective to act on the displacer because the bottom of the latter has moved upward from the level l some distance such as T. Therefore the lifting force which is effective on the displacer is the ratio of the distance between the bottom of the displacer and the surface S to the distance between the surface S and the level l of the settled bed, times the lifting force at the level l.

This relation can be expressed as a mathematical equation and with certain factors known the units of the scale 16 can be laid out to indicate the extent of sand expansion, although as already described the pointer 18 is actuated primarily in response to the effective lifting force occasioned by the rising of the sand above the bottom of the displacer.

Taking R as the spring constant or weight in lbs. required to deflect the spring 24 one inch, T as the travel of the displacer 26 in inches from the level l of the surface of the settled sand bed, L as the difference of pressure in inches of water, due to resistance to flow between the level of the sand surface S when expanded and the level l of the surface of the settled sand bed, Y the distance in inches between the level of the sand surface S when expanded and the level l of the surface of the settled sand bed, and $a$ as the area in square inches of the cross section of the displacer 26, the following equation can be written:

$$RT = L\left(\frac{Y-T}{Y}\right) \times \frac{433a}{12}$$

From this equation the calibration of the indicator scale can be readily computed for any desired units. When so calibrated, and the operator being informed at what unit the pointer should be held to indicate the desired washing conditions, he will open the valve controlling the flow of wash water until the pointer reaches the desired reading on the scale.

In order to compensate for variations in settled bed depth, means are provided for changing the relative angular movements of the pointer 18 with respect to the drum 20. For this purpose, we interpose a link 28 connected at one end to an arm 30 fastened to the same axle as is the pointer 18, and at the other end to an arm 32 fastened to the same axle as the drum 20. The arm 32 consists of two parts, 32a and 32b, hinged together and adjustable in relation to each other by the screw 34 by which the effective length of the arm can be varied. Reference to Fig. 1 will show that, if the part 32b is swung toward the part 32a, the arm 32 as a whole is adjusted to a shorter effective length, causing the pointer 18 to be moved thru a smaller angle for the same displacer travel. Also, if the part 32b is swung away from the part 32a, the effective length of arm 32 is made longer, causing the angular movement of the pointer 18 to be greater for the same displacer travel. Thus the linkage can be adjusted to produce the desired movement of the pointer (as required to correspond with the scale), for any reasonable variation in travel of the displacer. In other words, if the actual settled-bed depth is a little less than originally designed, 50% expansion of the deficient bed will move the displacer a distance slightly less than would 50% expansion of a full-depth bed, but by adjusting arm 32 to a length slightly longer than normal, the movement of the displacer will cause the indicator to show properly a 50% expansion of the deficient bed.

We claim:

1. A sand expansion indicator comprising means for indicating the extent of expansion of a sand bed occasioned by flow of wash water therethrough, and means for actuating said indicating means comprising a displacer having a specific gravity greater than that of water or that of a mixture of the water and sand, and means associated with said displacer for counterbalancing the change in the lifting effect exerted on said displacer by the pressure of the flowing wash water.

2. A sand expansion indicator comprising means for indicating the extent of expansion of a sand bed occasioned by flow of wash water therethrough, and means comprising a displacer adapted to submerge in said sand bed and responsive to a lifting force occasioned by said flow and corresponding to the extent of said expansion for actuating said indicating means, and comprising means applying a supporting force on said displacer effective to maintain the displacer with its bottom at the surface of the settled bed and being adapted to change said effective force to counterbalance the change in the lifting force occasioned by flow of the wash water.

3. A sand expansion indicator comprising means for indicating the extent of expansion of a sand bed occasioned by flow of wash water therethrough, and means for actuating said indicating means including a spring and a displacer partly supported by the spring and partly supported by a lifting force occasioned by the pressure of the flowing wash water; the said spring being effective to maintain the displacer with its bottom end at the surface of the settled bed when no flow of the wash water occurs.

4. A sand expansion indicator comprising means for indicating the extent of expansion of a sand bed occasioned by flow of wash water therethrough, a displacer having a specific gravity greater than that of water or that of a mixture of the water and sand, a spring exerting a lifting force on said displacer capable of supporting the displacer with its bottom end at the surface of the settled bed, and means connecting said displacer with said indicating means; the said displacer being moved upward in accordance with the lifting force exerted on it by the pressure of the flowing wash water.

5. A sand expansion indicator having means for indicating the extent of expansion of a sand bed occasioned by flow of wash water therethrough, and means for actuating said indicating means comprising a displacer normally supported with its bottom at the surface of a settled sand bed, and a spring effective to support said displacer in said position; the spring yielding and exerting less supporting effect as the flow of wash water occurs and establishes a pressure acting as a lifting force on the displacer, the combined supporting effect of said spring and said lifting force being constant as the displacer moves upward in predetermined relation to the extent of the sand expansion.

JOHN C. THORESEN.
JOHN R. HARTLEY.